United States Patent
Ariyoshi

[19]

[11] Patent Number: 6,014,654
[45] Date of Patent: *Jan. 11, 2000

[54] INFORMATION FILTERING APPARATUS FOR FILTERING INFORMATION FOR INTERESTS OF USERS AND A METHOD THEREFOR

[75] Inventor: Yusuke Ariyoshi, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/828,060

[22] Filed: Mar. 28, 1997

[30] Foreign Application Priority Data

Mar. 29, 1996 [JP] Japan .................................. 8-075781

[51] Int. Cl.$^7$ ...................................................... G06F 17/00
[52] U.S. Cl. ............................................... 706/62; 706/14
[58] Field of Search ................................. 395/61, 50, 51, 395/77, 62; 706/45, 61, 62, 14

[56] References Cited

U.S. PATENT DOCUMENTS

| | | | |
|---|---|---|---|
| 5,652,829 | 7/1997 | Hong ........................................... | 395/75 |
| 5,696,884 | 12/1997 | Heckerman et al. ...................... | 395/50 |
| 5,704,017 | 12/1997 | Heckerman et al. ...................... | 395/61 |
| 5,704,018 | 12/1997 | Heckerman et al. ...................... | 395/75 |
| 5,754,938 | 5/1998 | Herz et al. ................................. | 455/4.2 |
| 5,754,939 | 5/1998 | Herz et al. ................................. | 455/4.2 |
| 5,790,935 | 8/1998 | Payton ....................................... | 455/5.1 |
| 5,799,304 | 8/1998 | Miller ......................................... | 707/7 |
| 5,835,087 | 11/1998 | Herz et al. ................................. | 345/327 |
| 5,842,199 | 11/1998 | Miller et al. ............................... | 707/2 |
| 5,867,799 | 2/1999 | Lang et al. ................................. | 707/1 |
| 5,872,850 | 2/1999 | Klein et al. ................................ | 380/49 |
| 5,890,152 | 3/1999 | Rapaport et al. .......................... | 707/6 |
| 5,907,836 | 3/1999 | Sumita et al. .............................. | 707/3 |
| 5,918,014 | 6/1999 | Robinson .................................. | 709/219 |

OTHER PUBLICATIONS

Haraiwaw, S., et al., "Info–Plaza: A Social Information Filtering System for the World–Wide Web," Proc. of the 1996 Int'l. Conf. on Parallel and Distributed Systems, IEEE, pp. 10–15, Jun. 1996.

Sheth, B., et al., "Evolving Agents for Personalized Information Filtering," Proc. of the 9th Conf. on Artificial Intellignece for Applications, IEEE, pp. 345–52, Mar. 1993.

Miller, B., "GroupLens: An Open Architecture for Collaborative Filtering," ftp://ftp.cs.umn.edu/users/bmiller/prop.ps, Univ. of Minn., pp. 1–18, Oct. 1995.

*Primary Examiner*—Zarni Maung
*Assistant Examiner*—Andrew Caldwell
*Attorney, Agent, or Firm*—Foley & Lardner

[57] ABSTRACT

An information filtering apparatus estimates an evaluation value (suitability) of a demander with respect to an item which is not evaluated by the demander but is evaluated by users other than the demander. The information filtering apparatus estimates the suitability by studying relation among the demander and the other users with respect to an evaluation value evaluated for each item by the demander and the other users. A suitable estimating means may compute the suitability in consideration of the population density or an Leading-Edge degree. The suitability can be estimated by computing the Leading-Edge degree.

3 Claims, 7 Drawing Sheets

| USER ID NUMBER | ITEM ID NUMBER | EVALUATION |
|---|---|---|
| U0001 | I0001 | 1 |
| U0001 | I0002 | 5 |
| U0002 | I0005 | 3 |
| ⋮ | ⋮ | ⋮ |

FIG.2

| EVAL a | EVAL b | EVAL c | SIMILARITY A | EVAL d | POPULATION |
|---|---|---|---|---|---|
| 1 | 1 | 1 | 1 | 1 | 1 |
| 1 | -1 | 1 | 1/3 | 1 | 1 |
| -1 | 1 | 1 | 1/3 | -1 | 1 |
| -1 | -1 | 1 | -1/3 | 1 | 1 |

FIG.4

| USER ID NUMBER | ITEM ID NUMBER | EVALUATION | EVALUATION TIME |
|---|---|---|---|
| U0001 | I0001 | 1 | 95/05/07 9:21:13 |
| U0001 | I0002 | 5 | 95/05/08 13:05:07 |
| U0002 | I0005 | 3 | 95/05/09 11:07:25 |
| ........ | ........ | ........ | |

FIG.6

INFORMATION FILTERING APPARATUS FOR FILTERING INFORMATION FOR INTERESTS OF USERS AND A METHOD THEREFOR

BACKGROUND OF THE INVENTION

The present invention relates to an information filtering apparatus and a method therefor, more particularly to a information filtering apparatus which filters information for interests and tastes of users chosen among a plurality of the information and selects services for interests and tastes among services and recommends the services to the users.

The information filtering apparatus selects and filters the information meeting the interests and the tastes of the users among the plurality of the information. Moreover, in a broader sense, the information filtering apparatus selects the services which meet the interests and tastes of the users among the plurality of the services and recommends them to the users. Filtering of the information, described later, shall include the recommendation of the services.

A conventional information filtering apparatus has adopted a method for directly retrieving primary information which is an object of the interest itself. The conventional information filtering method also has adopted a method for fetching out the desired information by filtering secondary information (e.g., a title, a name of author, a keyword, and a word appearance frequency).

In recent years, a filtering technology referred to as "a social filtering" and "a collaborative filtering" has been studied, in which evaluation results (evaluation values) of the users for objective items is previously stored as item evaluation information, and the evaluation value evaluated in the past by the user who demanded the filtering (hereinafter referred to as a "demander") is compared with the evaluation value evaluated in the past by a user other than the demander. In this conventional filtering technology, a user having a taste similar to that of the demander is then found out and an item highly evaluated by this user, which is not found out yet, is chosen. In this conventional filtering technology, relating to the evaluation values evaluated for individual items by the user and the evaluation values evaluated by other users, the relation between the demander and other users is studied by means of the evaluation values of the demander and other users, whereby the evaluation value of the demander is estimated as to the item which is not evaluated by the demander but by other users. The evaluation value estimated in such a manner is called "suitability".

However, in the conventional information filtering apparatus as described above, when the user shows an unbalanced trend for the specified interest and the taste, there has been a problem that the unbalanced trend has an effect on the suitability.

Moreover, in the conventional information filtering apparatus, many pieces of item evaluation information are a required to estimate the evaluation value with a high accuracy. A new objective item, in general, has a small number of the item evaluation information, so that there has been a problem that the estimation accuracy of the evaluation value gets worse as the objective item is newer.

SUMMARY OF THE INVENTION

In view of the foregoing problem of the conventional system, an object of the present invention is to solve the above-describe problems, and to control the variation in the suitability even when the user shows an unbalanced trend for interests and tastes. Another object of the present invention is to acquire the evaluation value with a estimation accuracy even when the item evaluation information is fewer.

In an information filtering apparatus according to a first aspect of the present invention, computing means computes similarity between an evaluation value of a demander for filtering and that of a user other than the demander. Generating means generates a parameter based on the evaluation value of the user. Estimating means estimates a suitability based on the similarity computed by the similarity computing means and the parameter generated by the parameter generating means.

With the unique and unobvious structure of the present invention, the information filtering apparatus provides the evaluation value (i.e. the suitability) which shows little variance in estimation and has a high estimation accuracy.

BRIEF DESCRIPTION OF THE DRAWINGS

The above-mentioned and other objects, features and advantages of this invention will become more apparent by reference to the following detailed description of the invention taken in conjunction with the accompanying drawings in which:

FIG. 2 is a table of item evaluation information stored in a item evaluation information memory 41;

FIG. 4 is an example of a table of item evaluation information concerning four objective items a, b, c and d;

FIG. 6 is a table of item evaluation information stored in a item evaluation information memory 61;

DETAILED DESCRIPTION OF THE PREFERRED EMBODIMENTS

An information filtering apparatus in accordance with preferred embodiments of the present invention will be described in detail with reference to the accompanying drawings.

Figure 1:
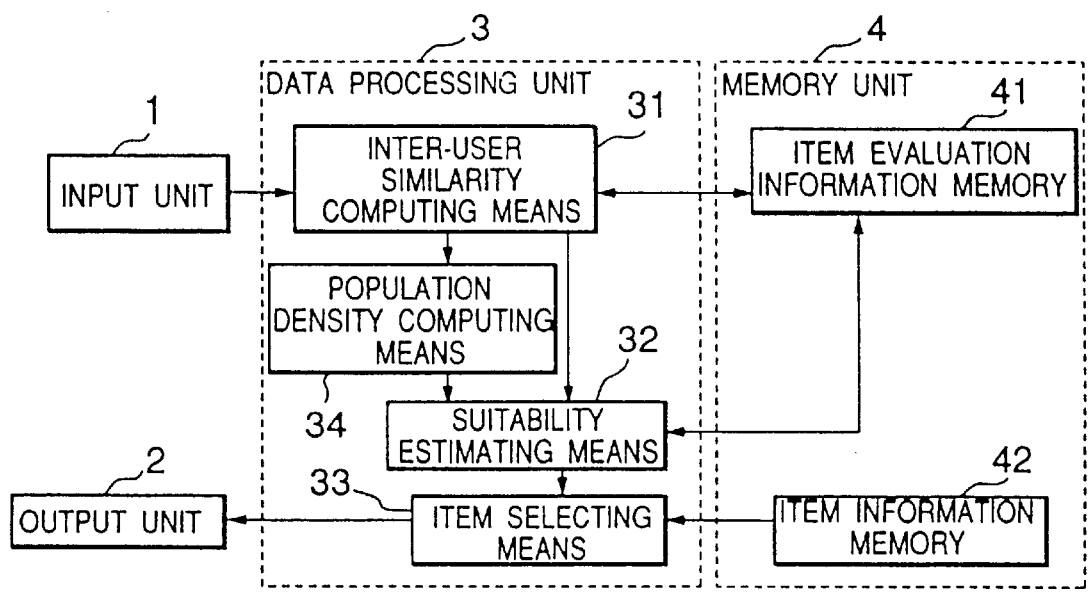
FIG. 1. is a block diagram showing the configuration of a first embodiment of an information filtering apparatus according to a first embodiment of the present invention.

Referring to FIG. 1, an information filtering apparatus of a first embodiment includes an input unit 1 to which a filtering demand is input, a data processing unit 3 which estimates an evaluation value (i.e., suitability) for every objective item for a user who demands filtering (hereinafter referred to as a demander), a memory unit 4 which stores the evaluation values by a plurality of users as item evaluation information, and an output unit 2 which outputs a demand result.

The memory unit 4 includes an item evaluation information memory 41 and an item information memory 42. The item evaluation information memory 41 stores the item evaluation information by the plurality of the users. The item information memory 42 stores secondary information such as an item name and an identification (ID) number to identify the objective item.

Furthermore, the data processing unit 3 includes inter-user similarity computing means 31, population density computing means 34, suitability estimating means 31 and item selecting means 33.

In response to a demand of the demander through the input unit 1, the inter-user similarity computing means 31 computes the similarity of the users to the demander based on the item evaluation information stored in the item evaluation information memory 41.

The population density computing means 34 computes a local population density at the vicinity of the users, which indicates how many users having similar interest and taste exist, based on the similarity information among the users computed with the inter-user similarity computing means 31.

The suitability estimating means 32 estimates the evaluation value of every objective item for the demander (i.e., the suitability) from the item evaluation information stored in the item evaluation information memory 41, the inter-user similarity information computed by the inter-user similarity computing means 31, the local population density information computed with the population density computing means 34.

The item selecting means 33 selects the objective item which meets the demand based on the suitability estimated with the suitability estimating means 32 and outputs the selection result to the output unit 2.

Referring to FIG. 2, the item estimating information stored in the item evaluation information memory 41 includes a user ID number field, an item ID number field and an evaluation value field. The user ID number is used for identifying the user. The item ID number is used for identifying the item. The evaluation value is the one obtained as the result of the evaluation for the item by the user. For instance, the user "U0001" gives the evaluation value "1" for the item "I0001", and the evaluation value "5" for the item "I0002", respectively.

Referring to FIG. 1, the inter-user similarity computing means 31 computes the similarity, for example, between the demander and the "k"-th user according to the following formula. Here, $EVD_i$ represents the evaluation value of the demander. $EVU_{ki}$ represents the evaluation value of the "k"-th user.

$$\frac{\sum_{i=item} (EVD_i \times EVU_{ki})}{\sqrt{\sum_{i=item} EVD_i^2} \times \sqrt{\sum_{i=item} EVU_{ki}^2}}$$

Moreover, the population density computing means 34 uses, for example, the number of persons with the same evaluation value for the items as a local population density.

As another way, the local population density may be obtained using the inter-user similarity. In other words, the local population density in the vicinity of a k-th user shall be the number of users having a high inter-user similarity to the k-th user (e.g., the number of the users having the inter-user similarity more than "0.9"). When the k-the user becomes the demander, the inter-user similarity between the k-the user and the users other than the k-the user is computed. Therefore, at the time of computing, the number of the persons should be computed for the sake of high efficiency.

Moreover, the suitability estimating means 32 computes the suitability of the demander according to, for example, the following formula. Here, $SML_k$ represents the similarity between demander and the "k"-th user. $EVU_k$ represents the evaluation value for the "k"-th user. $LPD_k$ represents the local population density near the "k"-th user.

$$\frac{\sum_k \frac{SML_k \times EVU_k}{LPD_k}}{\sum_k \frac{SML_k}{LPD_k}}$$

Figure 3:
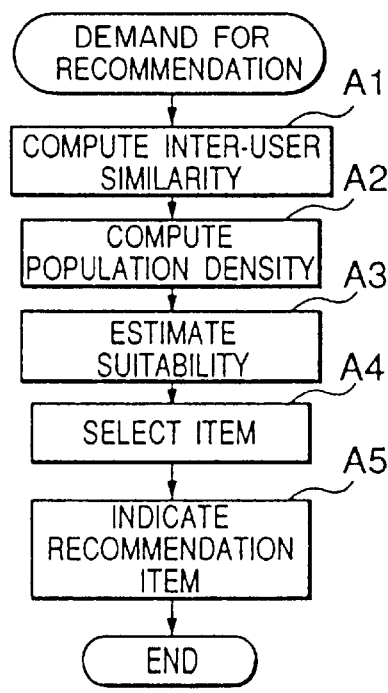
FIG. 3 is a flow chart showing an operation of the first embodiment of the information filtering apparatus of the present invention.

Next, an operation of a first embodiment of the information filtering apparatus of the present invention will be described with reference to FIG. 3.

When a filtering demand is input through the input unit 1, the inter-user similarity computing means 31 first computes the similarity between the demander and the users other than the demander using the item evaluation information stored in the item evaluation information memory 41 (Step A1).

Then, the local population density in the vicinity of the users is computed with the population density computing means 34, based on the similarity among the users computed with the inter-user similarity computing means 31 (Step A2).

Subsequently, the suitability estimating means 32 estimates the suitability for every objective item for the demander, referring to the item evaluation information stored in the item evaluation information memory 41, the inter-user similarity information computed with the inter-user similarity computing means 31, and the local population density computed with the population density computing means 34 (Step A3).

Finally, the item selecting means 33 selects the objective item meeting the demand with reference to the suitability estimated by the suitability estimating means 32 (Step A4) and outputs the result to the output unit 2 (Step A5).

Next, computing processes for the suitability in the first embodiment will be described using a concrete example.

Referring to FIG. 4, it is supposed that the evaluation values by four users as to the four items a, b, c and d have been obtained as the item evaluation information. Here, the evaluation value d of the user A who evaluates the objective items "a", "b" and "c" as "good" is estimated. Specifically, whether the objective item "d" meets the taste of the user A is estimated.

First, the inter-user similarity computing means 31 computes the similarity of other users to the user A according to the foregoing formula. The fourth column from the left of FIG. 4 represents this similarity. Then, with the computation of the suitability by the suitability estimating means 32. the suitability of "0.5" is obtained.

In case of this example, since the evaluations of the four users are different, the similarity of "0.5" will be also obtained according to the following conventional formula for computing the similarity. Here, $SML_k$ represents the similarity between demander and the "k"-th user. $EVU_k$ represents the evaluation value for the "k"-th user.

$$\frac{\sum_k (SML_k \times EVU_k)}{\sum_k SML_k}$$

However, when the number of other users who estimate "a" as "−1", "b" as "1", "c" as "1" and "d" as "−1" increases up to ten persons, the suitability will be "−7/13" with the conventional formula for computing the suitability. Also in this case, according to the first embodiment of the present invention, the suitability of "0.5" can be still kept. Specifically, this is because the suitability can be computed as follows.

$$\frac{1 \times 1 \cdot \frac{1}{1} \times 1 + \frac{\frac{1}{3} \times 1}{1} \times 1 + \frac{\frac{1}{3} \times (-1)}{10} \times 10 + \frac{\left(-\frac{1}{3}\right) \times 1}{1} \times 1}{\frac{1}{1} \times 1 + \frac{\frac{1}{3}}{1} \times 1 + \frac{\frac{1}{3}}{10} \times 10 + \frac{\left(-\frac{1}{3}\right)}{1} \times 1} = 0.5$$

As described above, in this embodiment, even when the evaluation results became unbalanced due to an increase in the users who made the same evaluation, the unbalanced evaluation results will less affect the estimation results for the suitability.

Since the population density represents the degree that the specified interest and tastes of the users are concentrated, the population density becomes larger in the vicinity of the concentration, and it becomes smaller as the number of the users is smaller. When the similarity among the users is divided by the population density, the weight of the item evaluation information at the time of estimating the suitability decreases in the objective item with respect to the vicinity of the concentration, and it increases in the objective item to which a small number of the users gather. Therefore, the influence due to the concentrated gathering of the users to the specified interest and taste is removed, whereby a high accuracy information filtering can be conducted.

Next, a second embodiment of the information filtering apparatus of the present invention will be described with reference to the drawings in detail.

Figure 5:
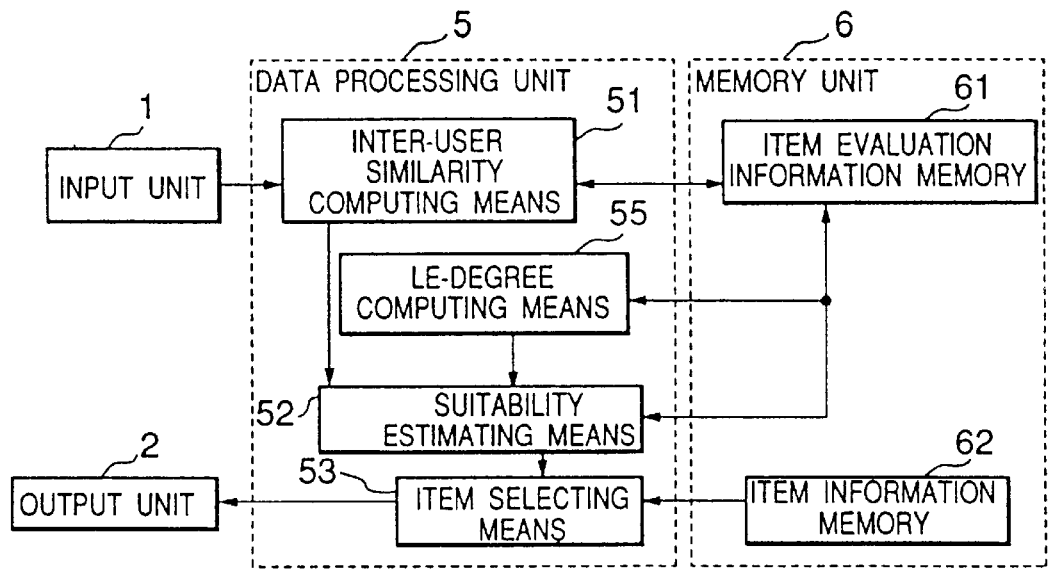
FIG. 5 is a block diagram showing a configuration of a second embodiment of an information filtering apparatus of the present invention.

Referring to FIG. 5, the information filtering apparatus of the second embodiment of the present invention includes an input unit 1 to which a filtering demand is input, a data processing unit 5 which estimates the evaluation value for every objective item for a demander, a memory unit 6 in which the evaluation values by a plurality of users are stored as item evaluation information, and an output unit 2 which outputs the demand result.

The memory unit 6 includes an item evaluation information memory 61 and an item information memory 62. The item evaluation information memory 61 previously stores the item evaluation information by the plurality of the users and the time (evaluation time) when the evaluation result is input thereto. The item information memory 62 previously stores secondary information such as a name of the item and an ID number for identifying the objective item.

Moreover, the data processing unit 5 includes inter-user similarity computing means 51, LE degree computing means 55, suitability estimating means 52 and item selecting means 53.

When the a demand from the demander is input to the inter-user similarity computing means 51 through the input unit 1, the inter-user similarity computing means 51 computes the similarity between the demander and the users other than the demander, using the item evaluation information stored in the item evaluation information memory 61.

The LE degree computing means 55 conducts the computation for every user as to the Leading-Edge degree (LE degree) indicating the degree of the reliability on the estimation information of the user, with reference to the item evaluation information and the evaluation time stores in the item evaluation information memory 61. Here, the LE degree represents the degree of rising up of the users, and it is assumed that the reliability on the evaluation information becomes higher as the user estimates the information sooner than other users do.

The suitability estimating means 52 estimates the suitability of every objective item for the demander, from the inter-user similarity information computed by the inter-user similarity computing means 51, the LE degree of the users computed by the LE degree computing 55, and the item evaluation information stored in the item evaluation information memory 61.

The item selecting means 53 selects the objective item meeting the demand with reference to the suitability degree estimated by the suitability estimating means 52 and outputs the selection result to the output unit 2.

Referring to FIG. 6, the item evaluation information stored in the item evaluation information memory 61 in the second embodiment includes a user ID number field. an item ID number field, an evaluation value field, and an evaluation time. The item evaluation information of the second embodiment is the same as that of the first embodiment except that it includes the evaluation time. The evaluation time is the time when the user makes the evaluation for the item. For example, the user "U0001" makes the evaluation for the item "I0001" at 9:21:13 AM on May 7, 1995.

Referring to FIG. 5, the inter-user similarity computing means 51 computes the similarity between the demander "a" and the b-the user as to the item "k" according to the following formula. Here, $EVDa_k$ represents the evaluation value on the "k"-th item of the demander "a". $EVUb_k$ represents the evaluation value on the "k"-th item of the user "b".

$$\frac{1}{EVDa_k - EVUb_k}$$

The LE degree computing means 55 computes the LE degree ($L_{ab}$) between the demander "a" and the "b"-th user according to the following formula. Here, $item_{ab}$ represents items which have been evaluated by both the demander "a" and the user "b". SML represents the similarity. $NUM_k$ represents the number of the users who have evaluated the "k"-th item. $NUM_{ab}$ represents the number of the items which have been evaluated by both the demander "a" and the user "b". $TO_k$ represents the time when the "k"-th item has been evaluated at the first time. $TU_k$ represents the time when the "k"-th item has been evaluated by the user. TP represents the present time.

$$L_{ab} = \frac{\sum_{k=\text{item}_{ab}} \left( SML \times 2^{\left(\frac{NUM_k(TO_k-TU_k)}{TO_k-TP}\right)} \right)}{NUM_{ab}}$$

The suitability estimating means 52 computes the suitability (SUT), for example, for every objective item for the users according to the following formula. Here, $LED_k$ represents the LE degree of the "k"-th user. $SML_k$ represents the similarity between the demander and the "k"-th user. $EVU_k$ represents the evaluation value of the "k"-th user.

$$SUT = \frac{\sum_k (LED_k \times SML_k \times EVU_k)}{\sum_k (LED_k \times SML_k)}$$

Figure 7:
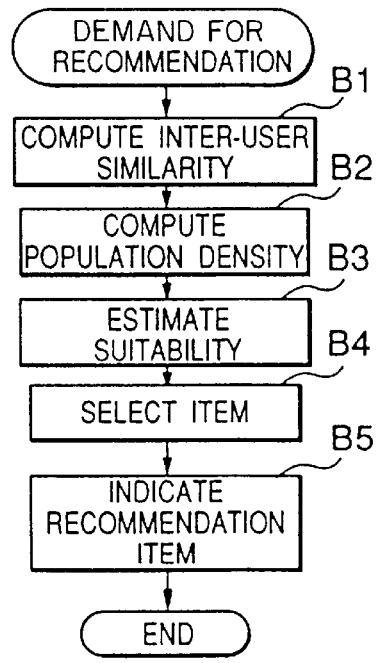
FIG. 7 is a flow chart showing an operation of the second embodiment of the information filtering apparatus of the present invention.

Next, an operation of the information filtering apparatus of the second embodiment of the present invention will be described with reference to FIG. 7.

When the a demand is input from the input unit 1 to the inter-user similarity computing means 51, the computing means 51 first computes the similarity among the users utilizing the item evaluation information stored in the item evaluation information memory 61 (Step B1).

Then, the LE degree computing means 55 computes the LE degree of the users from the item evaluation information and the evaluation time stored in the item evaluation information memory 61 (Step B2).

Subsequently, the suitability estimating means 52 estimates the suitability for every objective item for the demander, from the similarity information among the users computed by the inter-user similarity computing means 51, the item evaluation information stored in the item evaluation information memory 61, and the LE degrees of the users computed by the LE degree computing means 55 (Step B3).

Finally, the item selecting means 53 selects the objective item meeting the demand with the reference to the suitability estimated by the suitability estimating means 52 (Step B4) and outputs the selection result to the output unit 2 (Step B5).

As described above, the LE degree indicates the degree of the reliability for the evaluation information of the users because the reliability for the evaluation information of the users becomes higher as the users make the similar evaluations to that of the demander sooner. That is, the user having the interest and taste similar to that of the demander and performing, with a high reliability, the evaluation sooner than other users will be valued highly in the computation of the suitability. Therefore, the suitability to the demander can be estimated as to a new objective item with a higher accuracy.

Next, an information filtering apparatus of a third embodiment of the present invention will be described with reference to the drawings.

Figure 8:
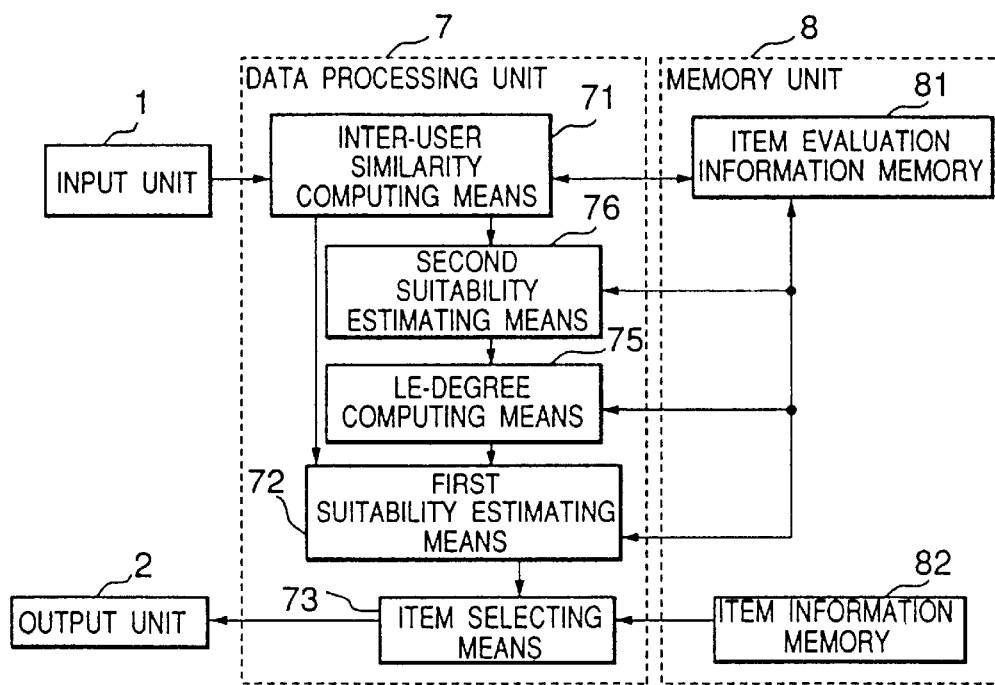
FIG. 8 is a block diagram showing a configuration of a third embodiment of an information filtering apparatus of the present invention.

Referring FIG. 8, the information filtering apparatus of the third embodiment of the present invention includes an input unit 1 to which a filtering demand is input, a data processing unit 7 which estimates an evaluation value for every objective item for the demander, a memory unit 8 in which evaluation values by a plurality of users are stored as item evaluation information, and an output unit 2 which outputs a demand result. The data processing unit 7 differs from the data processing unit 5 of the foregoing second embodiment in that the data processing unit 7 includes a second suitability estimating means 76.

The memory means 8 includes an item evaluation information memory 81 and an item information memory 82. The item evaluation information memory 81 previously stores an item evaluation information by a plurality of users and a time when an evaluation result was input. The item information memory 82 previously stores secondary information such as an item number and an ID number for identifying an objective item.

Moreover the data processing unit 7 includes inter-user similarity computing means 71, first suitability estimating means 72, LE degree computing means 75, second suitability estimating means 62, and item selecting means 73.

When a demand form a demander is input to the inter-user similarity computing means 71 through the input unit 1, the means 71 computes the similarity between a demander and users other than the demander, using the item evaluation information stored in the item evaluation information memory 81.

The second suitability estimating means 76 estimates the suitability for every objective item for the demander, from the item evaluation information stored in the item evaluation information memory 81 and the similarity information computed by the inter-user similarity computing means 71.

The LE degree computing means 75 computes the LE degree from the suitability estimated by the second suitability estimating means 76 and the evaluation time stored in the item evaluation information memory 81.

The first suitability estimating means 72 estimates the suitability for every objective item for the demander, from the similarity information among the users computed by the inter-user similarity computing means 71, the LE degree of the users computed by the LE degree computing means 71 and the item evaluation information stored in the item evaluation information memory 81.

The item selecting means 73 selects the objective item meeting the demand with reference to the suitability estimated by the first suitability estimating means 72 and outputs the selection result to the output unit 2.

The item evaluation information stored in the item evaluation information memory 81 includes the item shown in FIG. 6, like the case of the second embodiment. Moreover, the inter-user similarity computing means 71 computes the similarity between the demander "a" and the "b"-th user as to the item "k" according to the method similar to that by the inter-user similarity computing means 51 of the second embodiment. Furthermore, the second suitability estimating means 76 estimates the suitability for every objective item for the demander according to the method similar to that of the conventional apparatus. In addition the first suitability estimating means 72 computes the suitability for every objective item for the demander according to the method similar to that performed by the suitability estimating means 52 of the second embodiment. Furthermore, the LE degree computing means 75 computes, for example, the LE degree ($L_{ab}$) of the user "a" and the "b"-th user, according to the following formula. Here, $item_b$ represents items which have been evaluated by the user "b". SML represents the similarity. $NUM_k$ represents the number of the users who have evaluated the "k"-th item. $NUM_b$ represents the number of the items which have been evaluated by the user "b". $TO_k$ represents the time when the "k"-th item has been evaluated at the first time. $TU_k$ represents the time when the "k"-th item has been evaluated by the user. TP represents the present time.

$$L_{ab} = \frac{\sum_{k=\text{item}_b} \left( SML \times 2^{\left(-\frac{NUM_k(TO_k - TU_k)}{TO_k - TP}\right)} \right)}{NUM_b}$$

Figure 9:
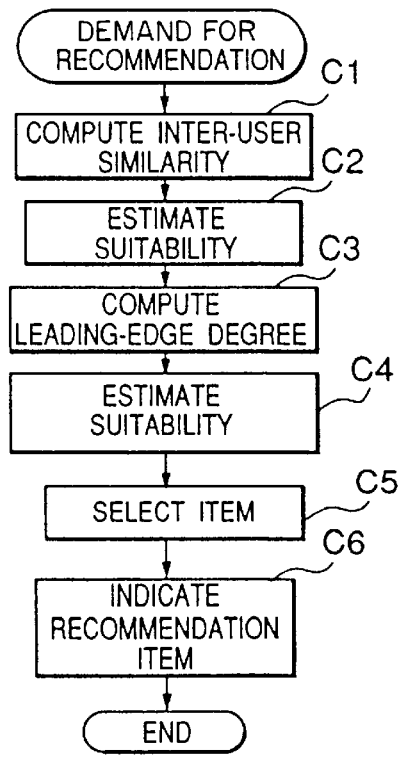
FIG. 9 is a flow chart showing an operation of the third embodiment of the information device of the present invention.

Next, an operation of the information filtering apparatus of the third embodiment of the present invention will be described with reference to FIG. 9.

When a demand is input to the inter-user similarity computing means 71 from the input unit 1, the inter-user similarity computing means 71 first computes the similarity among the users utilizing the item evaluation information stored in the item evaluation information memory 81 (Step C1).

Then, the second suitability estimating means 76 estimates the suitability for every objective item for the demander in the same manner as the prior art (Step C2).

The LE degree computing means 75 computes the LE degree using, instead of the item evaluation information of the users, the suitability for the demander which has been estimated by the second suitability estimating means 76 (Step C3).

Subsequently, the first suitability estimating means 72 estimates the suitability for every objectiv e item for the demander, from the similarity information among the users computed by the inter-user similarity computing means 71. the item evaluation information stored in the item evaluation information memory 81, and the LE degree of the users computed by the LE computing means 75 (Step C4)

Finally, the item selecting means 73 selects the objective item meeting the demand with reference to the suitability estimated by the suitability estimating means 72 (Step C5) and outputs the selection result to the output unit 2 (Step C6).

In this embodiment, the suitability is estimated again using the LE degree as to the item considered to meet the demand of the demander, whereby filtering can be conducted more accurately.

Next, a fourth embodiment of an information filtering apparatus of the present invention will be described with reference to the drawings.

Figure 10:
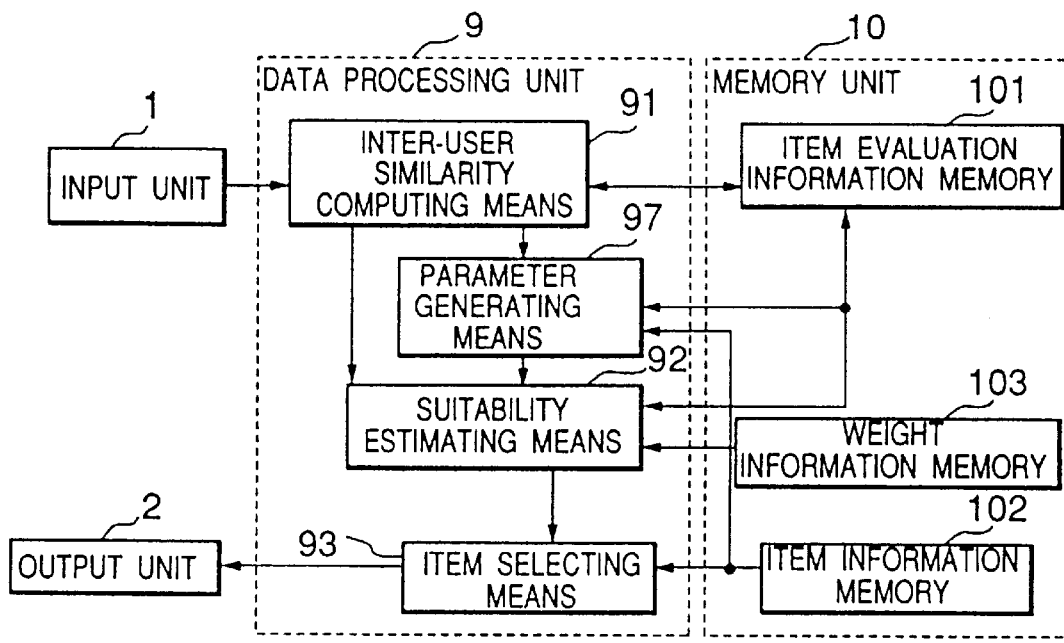
FIG. 10 is a block diagram showing a configuration of a fourth embodiment of an information filtering apparatus of the present invention.

Referring to FIG. 10, the information filtering apparatus of the fourth embodiment includes an input unit 1 to which a filtering demand is input, a data processing unit 9 which estimates an evaluation value for every objective item for a demander, a memory unit 10 in which estimation values by a plurality of users are stored as item evaluation information, and an output unit 2 which outputs a demand result.

The memory unit 10 includes an item evaluation information memory 101, an item information memory 102, and a weight information memory 103.

The item evaluation information memory 101 previously stores the item evaluation information by a plurality of users or the like. The item information memory 102 previously stores secondary information such as an item name and an ID number for identifying the objective item. The weight information memory 103 previously stores weight information for a parameter used at the time of estimating the suitability.

Furthermore, the data processing unit 9 includes interuser similarity computing means 91, parameter generating means 97, suitability estimating means 92, and item selecting means 93.

When a demand from a demander is input to the inter-user similarity computing means 91 through the input unit 1, the means 91 computes the similarity between the demander and the users other than the demander based on the item evaluation information stored in the item evaluation information memory 101.

The parameter generating means 97 computes the parameters other than the inter-user similarity information based on random information, among the inter-user similarity information computed by the inter-user similarity computing means 91, the item evaluation information stored in the item evaluation information memory 101, and the item information stored in the item information memory 102. This parameter includes the local population density of the first embodiment and the LE degrees of the second and third embodiments.

The suitability estimating means 92 estimates the suitability for every objective item for the demander, from the item evaluation information stored in the item evaluation information memory 101, the inter-user similarity information computed by the inter-user similarity computing means 91, the weight information stored in the weight information memory 103, and the parameter computed from the parameter generating means 97.

The item selecting means 93 selects the objective item meeting the demand with reference to the suitability estimated by the suitability estimating means 92 and outputs the selection result to the output unit 2.

Here, the item evaluation information stored in the item evaluation information memory 101 may include the item of FIG. 6, similar to the case of the second embodiment. Moreover, the inter-user similarity computing means 91 computes the similarity in the same manner as those in the prior art and the second embodiment.

Furthermore, the suitability estimating means 92 normalizes the standard deviation of each parameter in accordance with weight information in order that the standard deviation becomes the designated weight, and the means 92 estimates the suitability based on this normalized value. At this time, the suitability is estimated, for example, according to the following formula. Here, $NSML_k$ represents the normalized similarity between the demander and the "k"-th user. NPRM represents the normalized parameter. $EVU_k$ represents the evaluation value of the "k"-th user.

$$SUT = \frac{\sum_k (NSML_k \times NPRM \times EVU_k)}{\sum_k (NSML_k \times NPRM)}$$

It should be noted that the weight information need not be always stored in the weight information memory 103, and inputting of the weight information from the input unit 1 to the means 92 brings about the same effect as this embodiment.

Figure 11:
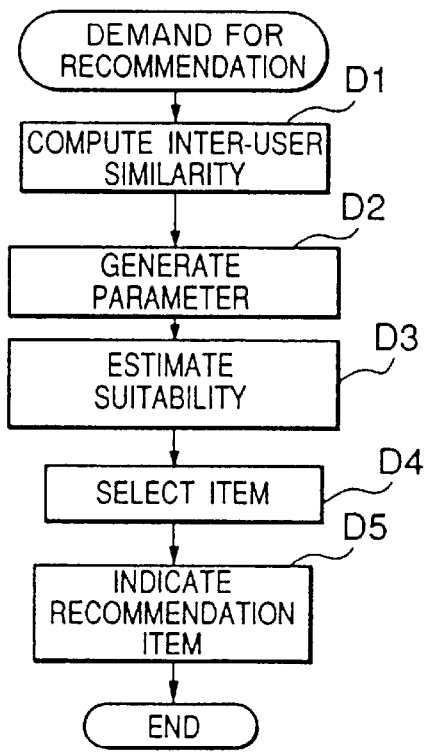
FIG. 11 is a flow chart showing an operation of the fourth embodiment of the information filtering apparatus of the present invention.

Next, an operation of the information filtering apparatus of the fourth embodiment of the present invention will be described with reference to FIG. 11.

When a demand is input to the inter-user similarity computing means 91 from the input unit 1, the means 91 computes the similarity among the users based on the item evaluation information which is stored in the item evaluation information memory 101 (Step D1).

The parameter generating means 97 generates the parameter to be provided to the suitability generating means 92, based on random information among the inter-user similarity information computed by the inter-user similarity computing means 91, the item evaluation information stored in the item evaluation information memory 101, and the item information stored in the item information memory 102 (Step D2).

The suitability estimating means 92 estimates the suitability for every objective item for the demander, from the inter-user similarity information computed by the interuser similarity computing means 91, the item evaluation information stored in the item evaluation information memory 101, the parameter computed by the parameter generating means 97, and the weight information for every objective item stored in the weight information memory 103 (Step D4).

Finally. the item selecting means 93 selects the objective item meeting the demand with reference to the suitability estimated by the suitability estimating means 92 (Step D5), and the means 93 output the selection result to the output unit 2 (Step D6).

As described above, in response to the field of the objective item and the rank of the users, the information filtering apparatus of the fourth embodiment of the present invention can designate the optimum weight to estimate the suitability for the demander, whereby filtering accuracy can be increased.

As is apparent from the above descriptions, according to the present invention, the evaluation value with less variation in estimation or with a high estimation accuracy, namely, the suitability can be provided, thereby allowing the information filtering apparatus of the present invention to perform a high accuracy information filtering.

While the invention has been described in terms of several preferred embodiments, those skilled in the art will recognize that the invention can be practiced with modification within the spirit and scope of the appended claims.

What is claimed is:

1. An information filtering apparatus comprising:

means for inputting a first evaluation value of a demander for filtering;

first storing means for storing a second evaluation value of a user other than said demander;

means for computing a similarity between the first evaluation value inputted from said input means and the second evaluation value stored in said first storing means;

means for generating a parameter based on the second evaluation value stored in said first storing means;

means for estimating a suitability based on both the similarity computed by said similarity computing means and the parameter generated by said parameter generating means;

second storing means for storing an evaluation item with respect to one of the first evaluation value inputted from said input means and the second evaluation value stored in said first storing means; and means for selecting the evaluation item stored in said second storing means based on the suitability estimated by said suitability estimating means, wherein said parameter generated by said parameter generating means includes a Leading-Edge degree which indicates the degree of the reliability on the evaluation value of users, wherein said first storing means stores a time at which each evaluation value is evaluated, and wherein said parameter generating means makes said Leading-Edge degree higher as the time at which each evaluation value is evaluated is earlier.

2. The information filtering apparatus according to claim 1, wherein the suitability is estimated to be higher as said time at which evaluation value is evaluated is earlier.

3. An information filtering apparatus including a data processing unit and a memory unit, the apparatus comprising:

an input unit for inputting a first evaluation value of a demander for filtering;

a first storage unit, in said memory unit, that stores a second evaluation value of a user other than said demander;

a similarity computing unit, in said data processing unit, that computes a similarity between the first evaluation value inputted from said input unit and the second evaluation value stored in said first storage unit;

a parameter generating unit, in said data processing unit, that generates a parameter based on the second evaluation value stored in said first storage unit;

a suitability estimating unit, in said data processing unit, that estimates a suitability based on the similarity computed by said similarity computing unit and the parameter generated by said parameter generating unit;

a second storage unit, in said memory unit, that stores an evaluation item with respect to one of the first evaluation value inputted from said input unit and the second evaluation value stored in said first storage unit; and an item selecting unit, in said data processing unit, that selects the evaluation item stored in said second storage unit based on the suitability estimated by the suitability estimating unit, wherein said parameter generated by said parameter generating unit includes a Leading-Edge degree which indicates the degree of the reliability on the evaluation value of the users, wherein said first storage unit stores a time at which each evaluation value is evaluated, and wherein said parameter generating unit makes said Leading-Edge degree higher as the time at which each evaluation value is estimated is earlier.

* * * * *